(12) United States Patent
Taylor et al.

(10) Patent No.: US 9,249,331 B2
(45) Date of Patent: Feb. 2, 2016

(54) COATING COMPOSITION

(75) Inventors: Celia Charlotte Taylor, Windsor (GB);
Ralph Edward Chandler, Chobham (GB); Peter Mark Spiers, Uxbridge (GB); Gary Thomas Wren, Ashford (GB); David Elliot, Marlow (GB)

(73) Assignee: IMPERIAL CHEMICAL INDUSTRIES LIMITED, London (GB)

( * ) Notice: Subject to any disclaimer, the term of this patent is extended or adjusted under 35 U.S.C. 154(b) by 1895 days.

(21) Appl. No.: 11/721,413

(22) PCT Filed: Dec. 12, 2006

(86) PCT No.: PCT/EP2006/011942
§ 371 (c)(1),
(2), (4) Date: Apr. 4, 2011

(87) PCT Pub. No.: WO2007/071331
PCT Pub. Date: Jun. 28, 2007

(65) Prior Publication Data
US 2011/0186781 A1   Aug. 4, 2011

Related U.S. Application Data

(60) Provisional application No. 60/771,970, filed on Feb. 10, 2006.

(30) Foreign Application Priority Data

Dec. 21, 2005   (GB) .................................. 0525985.8

(51) Int. Cl.
*C09K 11/02*   (2006.01)
*C09D 133/00*   (2006.01)

(52) U.S. Cl.
CPC .............. *C09D 133/00* (2013.01); *C09K 11/02* (2013.01)

(58) Field of Classification Search
CPC .............................. C09D 133/00; C09K 11/02
USPC ......................................................... 106/400
See application file for complete search history.

(56) References Cited

U.S. PATENT DOCUMENTS

| 3,838,085 A | 9/1974 | Myers et al. |
| 5,874,491 A | 2/1999 | Anders et al. |

FOREIGN PATENT DOCUMENTS

| EP | 0 928 819 | 7/1999 |
| EP | 1 433 797 | 6/2004 |
| JP | 01-193371 | 8/1989 |
| JP | 2001-081405 | 3/2001 |

OTHER PUBLICATIONS

International Search Report for PCT/EP2006/011942, dated Jul. 5, 2007, 6 pages.

(Continued)

*Primary Examiner* — Shuangyi Abu Ali
(74) *Attorney, Agent, or Firm* — Kenyon & Kenyon LLP

(57) ABSTRACT

A colored coating composition comprising a white base paint and at least one colored pigment in a form that can be readily mixed with the white base paint, the white base paint comprising a film-forming polymer, a liquid carrier, one or more opacifying white pigments and one or more extenders, the colored coating composition having a light reflectance value Y less than 110, and greater than that defined by the equation Y=mC+K, where 25>C>1.0, C being the chroma of the colored coating composition, m and K being empirical coefficients selected according to the type and number of the type of the at least one colored pigment, and dependant on the hue angle of the coating composition.

7 Claims, 2 Drawing Sheets

(56) References Cited

OTHER PUBLICATIONS

Figure 1:
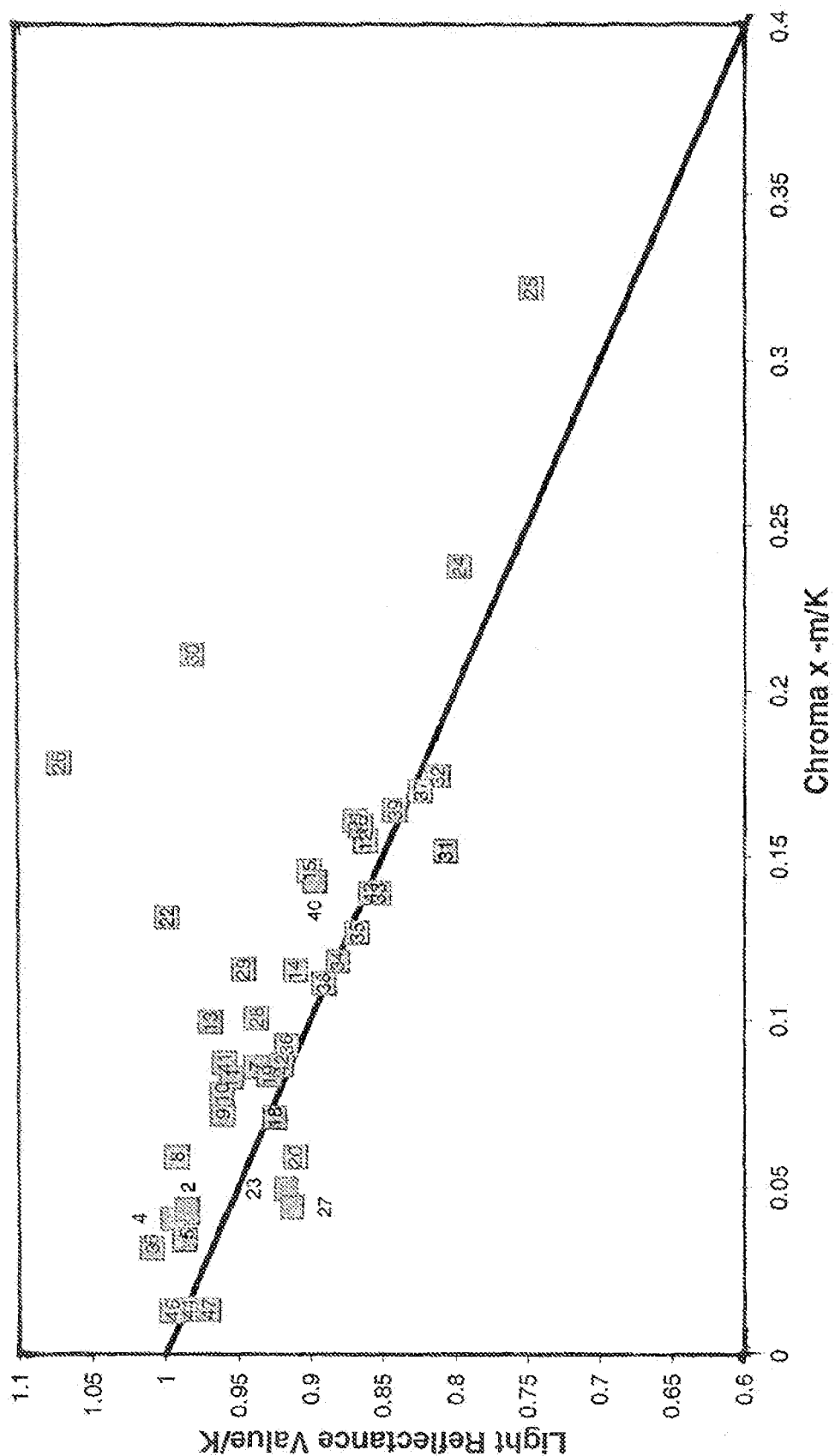

International Vocabulary of Lighting, 4$^{th}$ Edition Book, Commission Internationale de l'Eclairage (CIE), 1987, Table of Contents only, 5 pages.

Yen, W. M., et al., "Compositions, Preparation and Optical Properties", Inorganic Phosphors, Book, Jun. 25, 2004, Table of Contents only, 3 pages.

Hunt, R. W. G., et al., "The Reproduction of Colour", 2004, Book, Table of Contents only, 15 pages.

Kubelka, P., eta l., Zeits f. techn. Physik, 1931, vol. 12, pp. 593-601.

COATING COMPOSITION

CROSS-REFERENCE TO RELATED APPLICATION

This application is the national phase under 35 U.S.C. §371 of PCT International Application No. PCT/EP2006/01 942 having an international filing date of Dec. 12, 2006 entitled "A COATING COMPOSITION", which claims the benefit of priority to Great British Patent Application No. 0525985.8, filed on Dec. 12, 2005. Also benefit is claimed of U.S. Provisional Patent Application Ser. No. 60/771,970 filed Feb. 10, 2006 entitled "A COATING COMPOSITION". The disclosure of all of these applications is hereby incorporated in their entirety by reference.

The present invention relates to a coating composition, and to a method of producing a coating composition.

Paint or similar coating compositions such as lacquers, varnishes or wood stains, is used by both the skilled professional decorator and the relatively unskilled do-it-yourself painter for a variety of reasons. Typically, these are to brighten up the surroundings and/or to match the colour of a particular item of furniture, floor or wall covering, and other surfaces found in buildings.

The colour of a coating composition is often defined in terms of its CIELAB lightness value, L*, its CIELAB chroma value, C* and its CIELAB hue value, h. "CIE" stands for the Commission Internationale de l'Eclairage and its CIELAB L*, C* and h values are well known and widely used. L* is a measure of the perceived lightness of the colour and "chroma", C*, is a measure of the intensity of a colour, i.e. the extent to which it is either a pastel colour or a strong colour or something in between. "Hue", h, is a measure of how reddish, yellowish, greenish or bluish a colour is.

Hue is defined by the Commission Internationale de l'Eclairage (CIE) in the 'International Vocabulary of Lighting', 4th Edition, CIE 17.4(1987), ISBN 3900734070 as being "the attribute of a visual sensation according to which an area appears to be similar to one of perceived colours red, yellow, green and blue, or a combination of two of them". The hue angle defines the position of the hue in the CIE L*a*b* colour space, where red, yellow, green and blue are at angles of 0°, 90°, 180° and 270°. Mathematically CIE hue angle, h, is defined by, $$h = \arctan(b^*/a^*)$$

where a* and b* measure where the colour is on the opponent red-green and yellow-blue axes respectively. They are related to the tristimulus values, X, Y and Z, $$a^* 500[(X/Xn)^{0.333} - (Y/Yn)^{0.333}]$$

$$b^* = 200[(Y/Yn)^{0.333} - (Z/Zn)^{0.333}]$$

where Xn, Yn and Zn are the tristimulus values for the reference white under the relevant illumination (e.g. D65 Northern sky daylight).

Another commonly used measure of lightness is Light Reflectance Value (denoted LRV or Y). This measures lightness on a different scale to L*, which corresponds with the physical amount of visible light reflected from a surface.

Consumers select a coating composition based on the requirements of the room in which the coating composition is to be used, with that particular coating composition being defined by the lightness, chroma and hue values.

Consumers often desire to make rooms as light as possible while still wanting to use decorative colours. This is particularly the case for small, dark rooms. With the limited space available for buildings, and the subsequent reduction in room size, it is likely that consumers will increasingly be looking to make rooms lighter as well as colourful.

Known coating compositions are limited in their LRV for the particular chroma required, and therefore, when applied to a surface in the room, are consequently limited in how much they can contribute to making the room lighter.

An object of the present invention is to provide a coating composition which when applied to a surface in a room makes the room lighter than is possible with currently available coating compositions having a similar chroma.

Thus according to the present invention there is provided a coloured coating composition comprising a white base paint and at least one coloured pigment in a form that can be readily mixed with the white base paint, the white base paint comprising a film-forming polymer, a liquid carrier, one or more opacifying white pigments and one or more extenders, the coloured coating composition having a light reflectance value Y loss than 110, and greater than that defined by the equation:

$$Y = mC + K,$$

where 25>C>1.0. C being the chroma of the coloured coating composition, m and K being empirical coefficients selected according to the type and number of the type of the at least one coloured pigment, and dependant on the hue angle of the coating composition.

By applying a coating composition having a LRV which, when dry, is in the range defined above to a room surface, the room is made lighter than would be the case with currently available coating compositions having a similar chroma.

The empirical constants m and K are selected according to the type, i.e. organic or inorganic, and the number of the type of coloured pigments, i.e. one, two, or three or more, and are dependent on the hue angle of the coloured coating composition. It is to be understood that the term organic also includes metal-organic ligand pigments.

In an embodiment of the invention describing a colour region A, the minimum LRV of the coloured coating composition required is calculated using the empirical constants m and K as defined in Table 3.

In an embodiment of the invention describing a colour region B, the minimum LRV of the coloured coating composition required is calculated using the empirical constants m and K as defined in Table 4. The minimum LRV to obtain a coloured coating region in colour region A is above that required for colour region B, i.e. colour region B is a wider region.

One way of achieving a coloured coating composition in region A requires the white base paint to have a minimum LRV of 93, the coloured coating composition to have a maximum of 0.015 wt % of carbon black pigment relative to the total dry weight of the coloured coating composition (based on a typical solids wt % of 50 for this type of coating composition), and then either, a maximum of two organic coloured pigments, or a maximum of one inorganic coloured pigment, or a mixture of one organic pigment and one inorganic pigment, the organic pigment capable of producing a coloured coating composition having a first hue, and the inorganic pigment capable of producing a coloured coating composition having a second hue, the first and second hues being separated by a maximum angle of 20 degrees. If the coating compositions are within a difference of 20 degrees, they are considered to be of similar hue.

One way of achieving a coloured coating composition in region B requires the white base paint to have a minimum LRV of 93, the coloured coating composition to have a maximum of 0.022 wt % of carbon black pigment relative to the total dry weight of the coloured coating composition (based on a typical solids wt % of 50 for this type of coating composition), and then either, three or more organic coloured pigments in significant quantities, or two or more inorganic coloured pigments in significant quantities, or a mixture of one organic pigment, and one inorganic pigment, the organic pigment capable of producing a coloured coating composition having a first hue, and the inorganic pigment capable of producing a coloured coating composition having a second hue, the first and second hues being separated by more than 20 degrees.

Thus it will be understood that the minimum coloured coating composition LRV required to achieve colour region A or B is dependant on the coloured pigments used.

The minimum LRV of 93 for the white base paint can be achieved by the selection of the one or more opacifying white pigments and one or more extenders according to the equation:

$$Y_{model} = A + \frac{w \cdot \langle Y \rangle_{ext} + F \cdot (1-w) \cdot \langle Y \rangle_{pig}}{w + (1-w) \cdot F}$$

where w is the weight fraction of the extender compared to the total weight of the one or more opacifying white pigments and one or more extenders, A and F are empirical coefficients with values of 0.785 and −0.0969 respectively, $\langle Y_{ext} \rangle$ is the opacifying white pigments weight-averaged light reflectance value of the one or more extenders and $\langle Y_{pig} \rangle$ is the weight-averaged light reflectance value of the one or more opacifying white pigments, the weight averaged light reflectance values being defined by the equations:

$$\langle Y_{ext} \rangle = \frac{\sum_i w_i \cdot Y_{ext}}{\sum_i w_i}, \text{ and } \langle Y_{pig} \rangle = \frac{\sum_i w_i \cdot Y_{pig}}{\sum_i w_i}$$

Therefore, it is possible to obtain a white base paint with the required LRV by selecting the white pigments and extenders accordingly.

Suitable examples of white pigments include titanium dioxide grades obtained via the cleaner chloride production route as opposed to the slightly dirtier grades from the sulphate process. Barium sulphate could also be used on account of its LRV value.

Suitable examples of extenders include precipitated grades of calcium carbonate, directly mined calcium carbonates, clean grades of magnesium calcium carbonate (Dolomite), clean grades of calcined, pulverized clays (aluminosilicates), and clean purified grades of magnesium silicate. The dirtier grades of clays that are often used in paints should be avoided.

In another embodiment, for the coloured coating composition to be defined within colour region A, the coloured coating composition can include a photoluminescent compound capable of emitting light in a particular part of the visible spectrum such that it increases the chroma of the coloured coating composition. The photoluminescent compound (PLC) may be an optical brightener, a fluorescing pigment or a phosphorescent pigment. It is to be understood that the use of the PLC to obtain the minimum LRV required for region A is not dependent on the white base paint having a minimum LRV of 93.

Suitable optical brighteners include Ciba® Uvitex® NFW and Tinopal CBSX (ex. Ciba Speciality Chemicals PLC, Charter Way, Macclesfield, Cheshire SK10 2NX), and Eastobrite OB1 [CAS 1533-45-5] (Eastman Chemicals, PO Box 431, Kingsport Tenn. 37662, USA).

Suitable flourescing pigments include Chartreuse AFN 10 (Radiant Color NV, Europark 1046, B-3530 Houthalen, Belgium), Invisible Blue S, Invisible Cyan S, Invisible Yellow S, Invisible Lemon S, Invisible Red S and Invisible Red R (Glowbug Ltd, Lisle Lane, Ely, Cambs. CB7 4AS, UK), Cartax CXDP [CAS 10128-55-9] (Clariant UK Ltd, Leeds, West Yorks. LS18 4RP, UK), and Lumogen F570 (BASF plc, PO Box 4, Earl Road, Cheadle Hulme, Cheadle, Cheshire SK8 6QG).

Suitable Phosphorescents pigments include heavy-metal doped strontium aluminates and doped zinc sulphides (ex. Lawrence Industries, PO Box 3000, Tamworth, Staffs. B79 7XJ). Inorganic phosphors are preferred over organic ones because of cost and light-fastness, with suitable examples given in 'Inorganic Phosphors; Compositions, Preparation and Optical Properties, W M Yen and M J Weber Eds. ISBN 0849319498, CRC Press, Publication date Jun. 25 2004

Advantageously, it is therefore possible to increase the chroma of a coloured coating composition by using a PLC, due to emission by fluorescence or phosphorescence in the same part of the visible spectrum as the part of the incident light preferentially reflected by the coloured pigments present. This negates the need to use a greater concentration of coloured pigment and the associated reduction in the lightness of the coloured coating composition due to the fact the more light is absorbed by the coloured pigments. Conversely, it is possible to use a PLC to maintain the same level of chroma and reduce the concentration of coloured pigment so that less light is absorbed and therefore the LRV of the coloured coating composition is increased.

The PLC can be applied as a top clear coating composition over a base coating composition, or the PLC in the form of an optical brightener or fluorescent pigment can be dispersed in the white base paint.

By using the quantities of extender and white pigment as defined by the equation above, it is possible to provide a coloured coating composition that has a higher LRV than those known in the art.

According to another aspect of the present invention there is provided a method of producing a coating composition comprising a white base paint and at least one coloured pigment in a form that can be readily mixed with the white base paint, the white base paint comprising a film-forming polymer, a liquid carrier, one or more opacifying white pigments and one or more extenders, the coloured coating composition having a light reflectance value Y less than 110, and greater than that defined by Equation 4 below by selecting quantities of extender and white pigment as defined by Equation 1 below.

According to another aspect of the present invention there is provided a method of producing a coating composition comprising a white base paint and at least one coloured pigment in a form that can be readily mixed with the white base paint, the white base paint comprising a film-forming polymer, a liquid carrier, one or more opacifying white pigments and one or more extenders, the coloured coating composition having a light reflectance value Y less than 110, and greater than that defined by Equation 4 below by adding a fluorescent pigment capable of emitting light in a particular part of the visible spectrum such that it increases the chroma of the coloured coating composition.

According to another aspect of the present invention there is provided a method of producing a coating composition comprising a white base paint and at least one coloured pigment in a form that can be readily mixed with the white base paint, the white base paint comprising a film-forming polymer, a liquid carrier, one or more opacifying white pigments and one or more extenders, the coloured coating composition having a light reflectance value Y less than 110, and greater than that defined by Equation 4 below by adding a photoluminescent compound capable of emitting light in a particular part of the visible spectrum such that it increases the chroma of the coloured coating composition.

Figure 2:
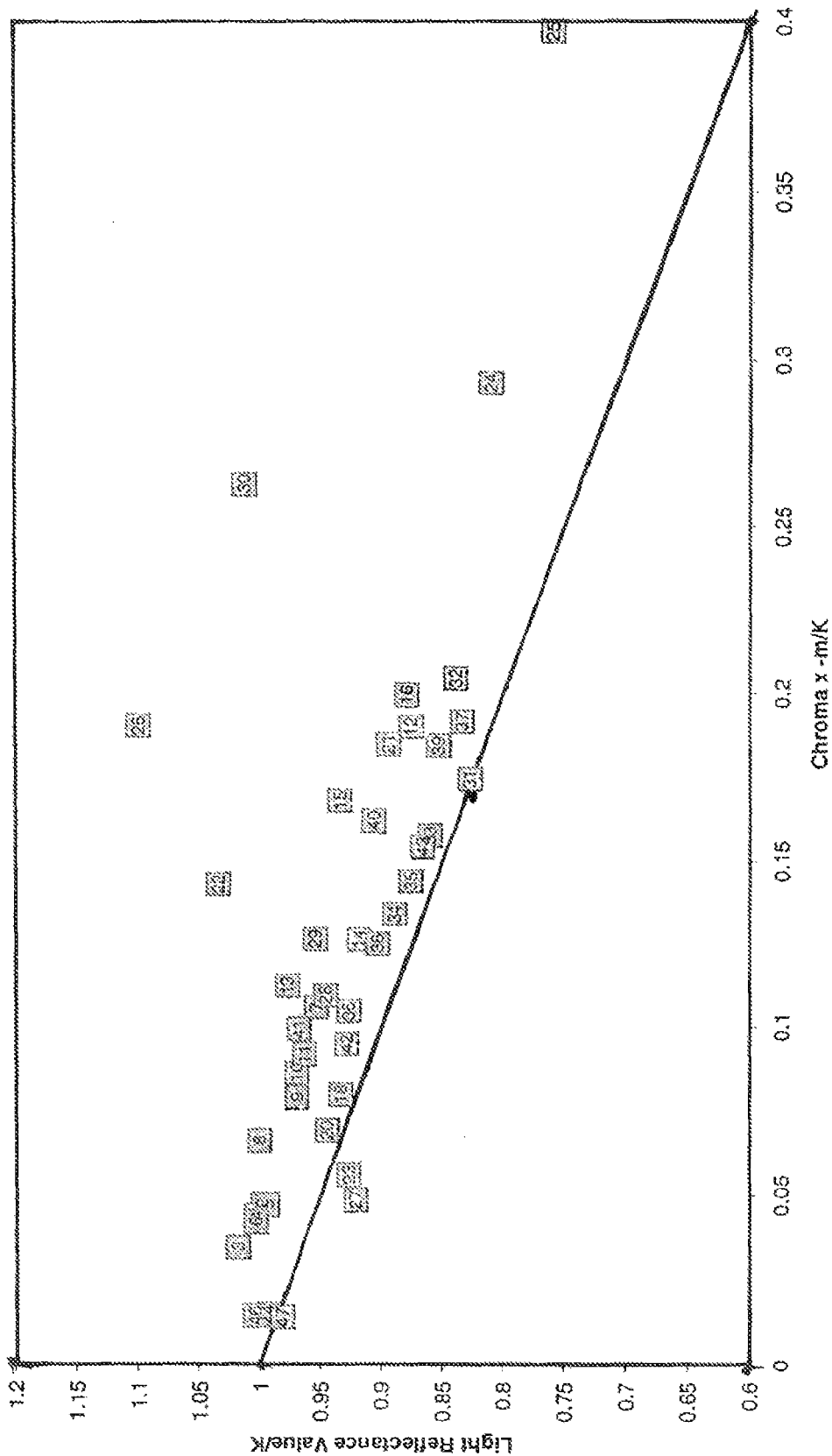

The invention will now be described by way of example only, with reference to Appendix A, and the accompanying drawings in which:

FIG. 1 is a graph showing (LRV/K) against (chroma multiplied by (−m/K)) for the coloured coating composition examples (region A), and FIG. 2 is a graph showing (LRV/K against (chroma multiplied by (−m/K)) for the coloured coating composition examples (region B).

A coloured coating composition is created by mixing together a white base paint comprising amongst other components, pigments and extenders, and a stable coloured pigment dispersion which can be readily mixed with the white base paint. The coloured coating compositions of Examples 1 to 47 are given in Table 1 of Appendix A. In Table 1, PLC refers to a photoluminescent compound, of which F is a fluorescent pigment, O is an optical brightener, and P is a phosphorescent pigment. Table 1 also identifies the number and type of coloured pigments used.

The pigments and extenders of the white base paint are selected according to their individual LRV's such that the light reflectance value of the white base paint is either above a minimum requirement, in which case the white base paint can be classified as clean (Examples 1 and 45) or below a minimum requirement, in which case the white base paint can be classified as dirty (Example 17).

Measurement of the Light Reflectance Value

The light reflectance value of the pigments and extenders in powder form is measured as follows:

Firstly, the powder is added to a shallow dish such that it completely fills the dish. It has been found that a 250 ml paint can lid is a suitable dish for this purpose. The filled lid is then placed between two sheets of polyester film ('Melinex'™, film type S, 19 microns thick), and stapled together such that the filled lid is tightly sandwiched between the two sheets. The LRV of the powder in the dish can now be measured in a vertical orientation against the standard port of a colour spectrophotometer. Whilst the above method is used to measure the LRV of the powders, any known method of measuring LRV can be used.

The LRV of the white base paints, and the Hue, Chroma, and LRV of the coloured coating compositions are measured by using a spectrophotometer on the dried coating.

Preparation of a White Base Paint

Example 1

The white base paint comprises the components and quantities as defined in Table 2 below.

TABLE 2

| Component | Sub-Component No. | Sub-Component Name | Sub-component Chemical Name | % by weight | LRV |
|---|---|---|---|---|---|
| Liquid carrier | 1 | Tap Water | Water | 33.8 | |
| | 2 | Dispersant | Aqueous solution of ammonium salt of an acrylic polymer. | 0.2 | |
| | 3 | Anti-foaming additive | Mineral oil blend (non-silicone). | 0.1 | |
| | 4 | Non-ionic surfactant | Aqueous solution of ethoxylated alcohols. | 0.5 | |
| | 5 | Coalescing solvent | Benzyl alcohol | 1.0 | |
| | 6 | Biocide | Aqueous solution of isothiazolines and halogenated alkanol derivatives. | 0.05 | |
| | 7 | Thickener | Sodium carboxymethyl cellulose | 0.7 | |
| | 8 | Ammonia | 0.88 SG ammonia solution. | 0.04 | |
| Extender | 9 | Extender A | Coatings grade calcium magnesium carbonate. | 7.0 | 92.9 |
| Extender | 10 | Extender B | Coatings grade calcium magnesium carbonate. | 8.6 | 93.6 |
| Pigment | 11 | Pigment A | Coatings grade titanium dioxide (rutile). | 14.7 | 98.1 |
| Pigment | 12 | Pigment B | Opacifying Styrene-acrylic co-polymer latex (30% wt. solids) | 4.8 | 97.0 |
| Film Forming polymer | 13 | Binder | Acrylic copolymer latex (53% wt. solids), film-forming at ambient temperature. | 28.5 | |

It is to be understood that white pigments are distinguished from extenders by their greater LRV (Y>95). This group includes inorganic compounds such as Titanium Dioxide and Barium Sulphate. It also includes opacifying polymer pigments such as 'Ropaque', available from the Rohm and Haas Company, 100 Independence Mall West, Philadelphia, Pa., 19106-2399, USA.

The white base paint is prepared as follows:

Firstly, a high-speed disperser (typical size 110 mm diameter) is charged with 15 parts of the tap water. The stirrer of the disperser is set at a low speed (typically 300 rpm), and sub-components 2 to 6 are added, followed by sub-components 9 to 11. The stirrer speed is then increased to a higher speed (typically 1500 rpm), and maintained at that speed for 10 minutes so as to disperse the components. Another 10 parts of the water is then added to thin the dispersed components followed by adding sub-component 7, and dispersion at the high speed for another 20 minutes. Then another 5 parts of water are added. This preparation is referred to as the mill base.

Sub-component 13 is then added to a separate mixing vessel (typical paddle size 150 mm diameter), and the stirrer is started (typical stirring speed 500 rpm). Sub-components 12, 8, the mill base, and 3.8 parts of water are then added sequentially to the separate mixing vessel, and the contents are stirred for 10 minutes. For clarity, it is to be understood that the term 'part' relates to the weight percentage of the white base paint, so for example 15 parts of tap water relates to 15% of the weight of the white base paint. It can be seen that the total parts of water equates to 33.8, i.e. the weight percentage of water in the white base paint.

The white base paint of Example 1 is prepared such that it has a LRV which is at least 93. Extenders A and B, and pigments A and B are selected according to there LRV's such that they meet the minimum LRV requirement of the white base paint. This selection is based on Equation 1 below.

$$Y_{model} = A + \frac{w \cdot \langle Y \rangle_{ext} + F \cdot (1-w) \cdot \langle Y \rangle_{pig}}{w + (1-w) \cdot F} \quad \text{Equation 1}$$

where w is the weight fraction of the extender compared to the total weight of the one or more opacifying white pigments and one or more extenders. A and F are empirical coefficients with values of 0.785 and −0.0969 respectively, $\langle Y_{ext} \rangle$ is the opacifying white pigments weight-averaged light reflectance value of the one or more extenders and $\langle Y_{pig} \rangle$ is the weight-averaged light reflectance value of the one or more opacifying white pigments, the weight averaged light reflectance values being defined by the Equations 2 and 3 below.

$$\langle Y_{ext} \rangle = \frac{\sum_i w_i \cdot Y_{ext}}{\sum_i w_i}, \quad \text{Equation 2}$$

and $$\langle Y_{pig} \rangle = \frac{\sum_i w_i \cdot Y_{pig}}{\sum_i w_i} \quad \text{Equation 3}$$

In this example detailed in Table 2, the extenders make up 15.6% by weight of the white base paint, and the pigments make up 19.5% by weight of the white base paint, and therefore w is equal to 0.44.

Applying the data from Table 2 to Equations 2 and 3 gives the weight-averaged light reflectance value of the one or more extenders and the one or more opacifying white pigments. Inputting these values into Equation 1 gives a LRV ($Y_{model}$) of the white base paint of 95.4. The measured LRV of the white base paint is 95.6.

Thus it can be seen that the extenders and pigments have been specifically selected on both type and quantity to create a white base paint that has a minimum LRV of 93.

Preparation of a Coloured Coating Composition

Example 2

The coloured coating composition according to Example 2 of Table 1 is prepared by adding, and stirring in, 0.0176 g of organic coloured pigment in the form of CI Pigment Red 112 Monoazo (CAS 6535-46-2) to 1298 g (1 liter) of the white base paint of Example 1. The coloured pigment is provided in a stable dispersion (colorant) that is readily miscible with the white base paint of Example 1, As an alternative to stirring in the colorant, it is also possible to shake the colorant and white base paint to produce the coloured coating composition.

The present invention relates to a coloured coating composition having a LRV value Y which is less than 110, and greater than that defined by Equation 4 below.

$$Y = mC + K \quad \text{Equation 4}$$

C is the chroma of the coloured coating composition and is limited according to, 25>C>1.0

The empirical constants m and K are selected according to the type, i.e. organic or inorganic, and the number of the type of coloured pigments, i.e. one, two, or three or more, and are dependent on the hue angle of the coloured coating composition.

For colour region A, m and K are defined according to Table 3, and for colour region B, m and K are defined according to Table 4.

TABLE 3

| Hue angle ° | m_A | k_A |
|---|---|---|
| 0 | −1.364 | 91.713 |
| 10 | −1.356 | 91.952 |
| 20 | −1.443 | 91.757 |
| 30 | −1.387 | 92.262 |
| 40 | −1.305 | 92.703 |
| 50 | −1.209 | 93.071 |
| 60 | −1.113 | 93.440 |
| 70 | −1.017 | 93.808 |
| 80 | −0.822 | 94.732 |
| 90 | −0.485 | 93.225 |
| 100 | −0.330 | 92.357 |
| 110 | −0.525 | 92.872 |
| 120 | −0.719 | 93.386 |
| 130 | −0.919 | 93.803 |
| 140 | −0.945 | 93.661 |
| 150 | −0.970 | 93.520 |
| 160 | −0.996 | 93.378 |
| 170 | −1.034 | 93.238 |
| 180 | −1.127 | 93.104 |
| 190 | −1.220 | 92.971 |
| 200 | −1.312 | 93.086 |
| 210 | −1.513 | 92.208 |
| 220 | −1.745 | 91.330 |
| 230 | −1.980 | 90.509 |
| 240 | −1.949 | 90.197 |
| 250 | −1.919 | 89.886 |
| 260 | −1.888 | 89.575 |
| 270 | −1.858 | 89.263 |
| 280 | −1.827 | 88.952 |
| 290 | −1.797 | 88.641 |
| 300 | −1.799 | 88.878 |
| 310 | −1.840 | 89.482 |
| 320 | −1.808 | 89.998 |
| 330 | −1.450 | 91.389 |
| 340 | −1.360 | 91.340 |
| 350 | −1.362 | 91.526 |
| 360 | −1.364 | 91.713 |

TABLE 4

| Hue angle ° | m_B | K_B |
|---|---|---|
| 0 | −1.650 | 90.213 |
| 10 | −1.643 | 90.452 |
| 20 | −1.587 | 90.957 |
| 30 | −1.581 | 87.462 |
| 40 | −1.433 | 91.903 |
| 50 | −1.337 | 92.271 |
| 60 | −1.267 | 89.640 |
| 70 | −1.145 | 93.008 |
| 80 | −0.911 | 93.432 |
| 90 | −0.553 | 92.425 |
| 100 | −0.355 | 91.557 |
| 110 | −0.558 | 88.072 |
| 120 | −0.743 | 92.586 |
| 130 | −1.006 | 93.003 |
| 140 | −1.032 | 92.861 |
| 150 | −1.057 | 92.720 |
| 160 | −1.083 | 92.578 |
| 170 | −1.131 | 92.438 |
| 180 | −1.224 | 92.304 |
| 190 | −1.317 | 92.171 |
| 200 | −1.410 | 92.286 |
| 210 | −1.643 | 91.408 |
| 220 | −1.874 | 90.530 |
| 230 | −2.169 | 89.709 |
| 240 | −2.138 | 89.397 |
| 250 | −2.145 | 86.086 |
| 260 | −2.077 | 88.775 |
| 270 | −2.047 | 88.463 |
| 280 | −2.016 | 88.152 |
| 290 | −1.985 | 87.841 |
| 300 | −1.968 | 88.078 |
| 310 | −2.009 | 88.682 |
| 320 | −1.986 | 89.198 |
| 330 | −1.806 | 89.889 |
| 340 | −1.646 | 89.840 |
| 350 | −1.648 | 90.026 |
| 360 | −1.650 | 90.213 |

It is to be understood that values of m and K at hue angles intermediate those shown in Tables 3 and 4 are obtained by linear interpolation.

Thus equation 4 defines two minimum LRV's required for colour regions A and B, depending on the type and number of coloured pigments used.

After preparing the white base paint of Example 1, and then adding the coloured pigment, the LRV, hue and chroma of the coloured coating composition was measured using a spectrophotometer, with the results, together with the minimum required LRV for the coating composition to be in the range defined by Equation 4, given in Table 5 of Appendix A.

To determine whether or not a coating composition falls within the claimed region defined by Equation 4, the LRV, chroma, and hue are measured. The minimum LRV required is calculated using Equation 4, using the measured chroma value, and the m and K values that correspond to the measured hue angle selected from either Table 3 or 4 depending on whether Region A or Region B is appropriate. If the measured LRV is greater than the minimum LRV required, and less than 110, then the coating composition falls within the claimed region.

It can be seen from Table 5 that the measured LRV of the coloured coating composition of Example 2 is 90.5 and that this is less than 110 and greater than the minimum LRV of 87.9 required according to Equation 4 (Region A) for the hue and chroma of the coloured coating composition.

The coloured coating composition falls within the range defined by Equation 4 (Region A) by virtue of the selection of one organic coloured pigment in a significant quantity, having no carbon black pigment, and selecting the opacifying pigments and extenders according to Equation 1 so that the white base paint has an LRV greater than 93, i.e. it is a clean white base paint.

For the avoidance of doubt, the term significant relates to the quantity of coloured pigment required to significantly detract from the lightness of the coloured coating composition, at a particular chroma. Whether or not the quantity of coloured pigment is considered to be significant is determined by the quantity required that gives a colour difference, delta E (CIE 1965 10° observer) of 2 for an inorganic pigment, and 3.5 for an organic pigment. Quantities of pigment below these levels are not considered significant, and therefore do not constitute a pigment for the purposes of determining the number of pigments present to determine whether colour region A or B applies for the minimum LRV requirement.

Table 9 gives the maximum permitted quantities of the coloured pigments used in the white base paint of Example 1 before they detract significantly from the lightness of the coloured coating composition. This quantity is defined by the amount of coloured pigment that changes the colour of the coating composition by the amounts shown. The colour change is quantified in terms of delta E for the 10° standard observer as defined by the CIE in 1965 (see e.g. 'The Reproduction of Colour', by R W G Hunt, Wiley, 2004, ISBN 0470024259). Here the levels were predicted using Kubelka-Munk theory and experimental scattering and absorption coefficients for the white base paint and the coloured pigments (see P Kubelka and F Munk, Zeits. f. techn. Physik, (12); 593-601, 1931). They could alternatively be obtained by experiment.

TABLE 9

| Coloured Pigment | Type | Maximum Colour Difference Allowed (CIE delta E (10° observer)) | Predicted level in white base of Example 1 wt % | Predicted level in white base of Example 1 g/liter |
|---|---|---|---|---|
| CI Pigment Red 101 | inorganic | 2 | 0.0026 | 0.034 |
| CI Pigment Yellow 42 | inorganic | 2 | 0.0085 | 0.11 |
| CI Pigment Blue 15.3 | organic | 3.5 | 0.00048 | 0.0063 |
| CI Pigment Violet 23 | organic | 3.5 | 0.00056 | 0.0073 |
| CI Pigment Red 112 | organic | 3.5 | 0.00089 | 0.012 |
| CI Pigment Yellow 74 | organic | 3.5 | 0.0041 | 0.053 |

Preparation of Alternative Coloured Coating Compositions

Examples 3 to 16

Examples 3 to 16 are examples of alternative coloured coating compositions which also use organic coloured pigments to give a different hue and chroma. Each of the organic pigments are added to 1298 g of the white base paint of Example 1. The type and quantity of coloured pigment, together with the chroma, hue, minimum LRV required, and measured LRV for the coloured coating composition are given in Tables 1 and 5 in the same way as Example 2.

It can be seen from Tables 1 and 5 that by providing a white base paint with a LRV above 93, and using either one or two coloured organic pigments, i.e. a maximum of two organic pigments, and less than 0.015 wt % of carbon black pigment by virtue of having no black pigment, the resulting coloured coating composition falls within the LRV range defined by Equation 4 (Region A).

Preparation of an Alternative White Base Paint

Example 17

An alternative white base paint comprises the components and quantities as defined in Table 6 below.

TABLE 6

| Component | Sub-Component No. | Sub-Component Name | Sub-component Chemical Name | % by weight | LRV |
|---|---|---|---|---|---|
| Liquid carrier | 1 | Tap Water | Water | 37.98 | |
| | 2 | Dispersant | Aqueous solution of ammonium salt of an acrylic polymer. | 0.3 | |
| | 3 | Anti-foaming additive | Mineral oil blend (non-silicone). | 0.2 | |
| | 4 | Non-ionic surfactant | Aqueous solution of ethoxylated alcohols. | 0.69 | |
| | 5 | Coalescing solvents | White spirit and high boiling ester alcohols. | 2.85 | |
| | 6 | Biocide | Aqueous solution of isothiazolines and formaldehyde. | 0.2 | |
| | 7 | Thickener | Sodium carboxymethyl cellulose | 0.55 | |
| | 8 | Ammonia | 0.88 SG ammonia solution. | 0.03 | |
| Extender | 9 | Extender A | Kaolin | 14.0 | 85.0 |
| | 10 | Extender B | Kaolin | 11.0 | 87.0 |
| | 11 | Extender C | Calcium carbonate | 10.2 | 95.2 |
| Pigment | 12 | Pigment A | Coatings grade titanium dioxide (rutile). | 9.5 | 95.5 |
| Film Forming Polymer | 13 | Binder | Styrene-acrylic copolymer latex (50% wt. solids), film-forming at ambient temperature. | 12.5 | |

The alternative white base paint of Example 17 is prepared as follows:

Firstly, a high-speed disperser the same as that used above is charged with 25 parts of the tap water. The stirrer of the disperser is set at a low speed, and sub-component 2, 0.1 parts of sub-component 3 is added, followed by sub-components 9 to 11. The stirrer speed is then increased to a higher speed, and components 12 and 7 are added. The mixture is dispersed for 30 minutes. An additional 12.98 parts of the water is then added to thin the dispersed components followed by adding 0.1 parts of sub-component 3 and sub-component 6, and dispersion at the high speed for another 10 minutes. This preparation is referred to as the mill base.

Sub-component 13 is then added to a separate mixing vessel the same as that used above, and the stirrer is started. Sub-component 8 and the mill base is then added to the mixing vessel and the contents are stirred for 10 minutes.

Using the LRV's of the pigments and extenders from Table 6, Equation 1 gives the light reflectance value ($Y_{model}$) of the white base paint as 89.7. The measured LRV of the white base paint is 89.2.

Thus, the white base paint of Example 17 is prepared such that it has a LRV which is below 93, with extenders A, B and C, and pigment A selected accordingly. The white base paint of Example 17 is therefore a dirty base, in contrast to the clean base of Example 1.

Preparation of Alternative Coloured Coating Composition

Examples 18 and 19

The coloured coating composition of Example 18 is prepared by adding, and stirring in, 0.725 g of organic coloured pigment in the form of CI Pigment Yellow 74 Monoazo to 1414 g (1 liter) of the white base paint of Example 17. The coloured pigment is provided in a stable dispersion (colorant) that is miscible with the white base paint of Example 17, in the same way that the coloured pigments of Examples 2 to 16 were readily miscible with the white base paint of Example 1.

This coloured coating composition has a hue of 94.3, a chroma of 15.7, and a measured LRV of 85.9. From Equation 4, the minimum LRV required is 86.3. Thus it can be seen that the coloured coating composition comprising the base paint of Example 17, and the pigment of Example 18 does not fall within the range of Equation 4 (Region A).

The coloured coating composition of Example 19 is prepared by using the coloured coating composition of Example 18 as a base coating, i.e. applied to a surface to be painted first, and then applying a clear top coating composition containing a photoluminescent compound in the form of a phosphorescent pigment on top of the base coating.

The top coating composition comprises the components of Table 7 below.

TABLE 7

| Component | Sub-Component No. | Sub-Component Name | Sub-component Chemical Name | % by weight |
|---|---|---|---|---|
| Liquid carrier | 1 | Tap Water | Water | 8.24 |
| | 2 | Humectant | Glycol Ether | 2.35 |
| | 3 | Anti-foaming additive | Mineral oil blend (non-silicone). | 0.329 |
| | 4 | Anionic surfactant | Sulfosuccinate | 0.145 |
| | 5 | Coalescing solvents | high boiling ester alcohols. | 1.49 |
| | 6 | Biocide | Aqueous solution of isothiazolines and halogenated alkanol derivatives. | 0.196 |
| | 7 | Thickener A | Hydrophobically-modified Ethylene Oxide Urethane (HEUR) rheology modifier. | 4.34 |
| | 8 | Thickener B | Hydrophobically-modified Alkali-Swellable Emulsion (HASE) rheology modifier. | 0.504 |
| Binder | 9 | Binder | Acrylic copolymer latex (46% wt. solids), film-forming at ambient temperature. | 80.40 |
| Pigment | 10 | Phosphorescent Pigment | Rare-earth metal doped Strontium Aluminate, grade SA-50 Yellow, ex. Lawrence Industries, PO Box 3000, Tamworth, Staffs. B79 7XJ | 2.0 |

Thus it can be seen that the top coating composition does not contain any other coloured pigments apart from the phosphorescent pigment.

The top coating composition is prepared as follows:

Firstly, a mixing vessel is charged with 6.26 parts of sub-component 1 and all of sub-components 2 and 5. Whilst stirring, sub-components 7 and 8 are slowly added. This mixture is stirred for another two minutes before adding sub-components 4 and 3. This mixture is then stirred for another 10 minutes before adding sub-component 6, and 8.72 parts of sub-component 9. This mixture is stirred for another 20 minutes and then the remainder of sub-component 9 is added slowly whilst still stirring. The remainder of sub-component 1 is then added, the mixture is stirred for another 20 minutes, and then sub-component 10 is added.

The top coating composition is then applied over the base coating composition of Example 18.

It can be seen from Table 5 that the base coating composition has a LRV that is outside the range of Equation 4 (Region A). However, when the top coating composition is applied over the base coating composition, the measured LRV is 85.8, which is greater than the minimum of 84.7 required by Equation 4 (Region A). Thus it can be seen that is the phosphorescent pigment in the coloured top coating composition that enables the combined base and top coating composition to fall within the range of Equation 4 (Region A). More specifically, it is the fact that a yellow phosphorescent pigment is used in the top coating composition that increases the chroma of the combined coating due to the presence of the yellow pigment in the base coating.

Furthermore, it can also be seen that the LRV of the combined base and top coating composition is achieved using a dirty white base paint, and therefore the phosphorescent pigment is able to increase the chroma of the combined coating composition despite using the dirty white base paint.

Preparation of Alternative Coloured Coating Compositions

Examples 20 and 21

Examples 20 and 21 are identical to Examples 18 and 19 except that an organic red pigment is used in the base coating of Example 20, and therefore, a red phosphorescent pigment (SA-50 Red, ex. Lawrence Industries) is used in the top clear coating of Example 21.

A comparison of Examples 20 and 21 shows that it is the use of the red phosphorescent pigment in the top clear coating that increases the chroma of the combined coating.

Preparation of an Alternative Coloured Coating Composition

Example 22

The coloured coating composition of Example 22 is prepared by dispersing 5.0 g of a photoluminescent compound in the form of fluorescent pigment Chartreuse AFN 10 (Radiant Color NV, Europark 1046, B-3530 Houthalen, Belgium) in 1414 g (1 liter) of the white base paint of Example 17.

From Tables 1 and 5 it can be seen that the coloured coating comprising a mixture of the dirty base coat of Example 17 and the fluorescent pigment falls within the range of Equation 4 (Region A). Thus, the use of a fluorescent pigment to increase the chroma and LRV also applies to a coating composition based on a dirty base.

Preparation of Alternative Coloured Coating Compositions

Examples 23 and 24

The coloured coating composition of Example 23 is prepared by adding 0.0740 g of Magenta organic coloured pigment in the form CI Pigment Red 122 Quinacridone to 1414 g (1 liter) of the white base paint of Example 17. It can be seen from Table 5 that the coloured coating composition does not fall within the range of Equation 4 (Region A).

The coloured coating composition of Example 24 is prepared by adding 7.07 g of fluorescent pigment AFN 18 Magenta (Radiant Color NV, Europark 1046, B-3530 Houthalen, Belgium) to the coloured coating composition of Example 23.

From Tables 1 and 5 it can be seen that the addition of the fluorescent pigment gives a coloured coating composition that falls within the range of Equation 4 (Region A).

Preparation of an Alternative Coloured Coating Composition

Example 25

The coloured coating composition of Example 25 is prepared by using the coloured coating composition of Example 23 as a base coat, and then adding a clear top coating composition containing a fluorescent compound.

The top coating composition comprises the components of Table 7

TABLE 7

| Component | Sub-Component No. | Sub-Component Name | Sub-component Chemical Name | % by weight |
|---|---|---|---|---|
| Liquid carrier | 1 | Tap Water | Water | 39.482 |
|  | 2 | Humectant | Glycol Ether | 2.289 |
|  | 3 | Anti-foaming additive | Mineral oil blend (non-silicone). | 0.308 |
|  | 4 | Non-ionic surfactant | C13-C15 Fatty acid alcohol ethoxylate, 80% in water. | 0.011 |
|  | 5 | anionic pigment dispersant | Polycarboxylic acid salt, 25% in water | 0.498 |
|  | 6 | Coalescing solvents | Benzyl alcohol and high boiling ester alcohols. | 2.139 |
|  | 7 | Thickener A | Hydrophobically-modified Ethylene Oxide Urethane (HEUR) rheology modifier. | 5.970 |
|  | 8 | Thickener B | Sodium Carboxymethyl Cellulose. | 0.706 |
|  | 9 | Ammonia | Aqueous ammonia solution 0.880 g/ml | 0.100 |
| Film Forming Polymer | 10 | Binder | Acrylic copolymer latex (50% wt. solids), film-forming at ambient temperature. | 42.776 |
| Pigment | 11 | Matting agent | Synthetic silica | 5.224 |
|  | 12 | Fluorescent pigment dispersion | AFN 18 Magenta ex Radiant Color NV, Europark 1046, B-3530 Houthalen, Belgium. | 0.498 |

The top coating composition is prepared as follows:

Firstly, a high speed dispersion vessel as used above is charged with 24.87 parts of sub-component 1 and 1.108 parts of sub-component 3, the contents being stirred at low speed. Sub-components 4 and 8 are slowly added, and the mixture is stirred for 30 minutes. Sub-components 5, 6, 2 and 7 and another 9.59 parts of sub-component 1 are then added followed by the slow addition of sub-component 11. The mixture is then dispersed at a higher speed for 60 minutes, and the remaining part of sub-component 1 is added. This preparation is referred to as the mill base.

Sub-component 10 is then added to a separate mixing vessel as used above, and the stirrer is started. Sub-component 9 is slowly added followed by the mill base. Sub-component 12 is then added and the contents are stirred for 5 minutes.

The top coating composition is then applied over the base coating composition of Example 23.

It can be seen from Table 5 that the base coating composition has a LRV that is outside the range of Equation 4 (Region A). However, when the top coating composition is applied over the base coating composition, the measured LRV is 68.3 which is greater than the minimum of 61.9 required by Equation 4 (Region A). Thus it can be seen that is the fluorescent pigment in the coloured top coating composition that enables the combined base and top coating composition to fall within the range of Equation 4 (Region A). More specifically, it is the fact that a magenta flourescent pigment is used in the top coating that increases the chroma of the combined coating due to the presence of the red pigment in the base coating.

Furthermore, it can also be seen that the LRV of the combined base and top coating composition is achieved using a dirty white base paint, and therefore the fluorescent pigment is able to increase the chroma of the combined coating composition despite using a dirty white base paint.

It can also be seen that the fluorescent pigment can be used as part of a top coating composition as well as dispersed in the white base paint as described in relation to the coloured coating composition of Example 22.

Preparation of an Alternative Coloured Coating Composition

Example 26

The coloured coating composition of Example 26 is prepared by dispersing 5.0 g of fluorescent pigment Chartreuse AFN 10 (Radiant Color NV, Europark 1046, B-3530 Houthalen, Belgium) to 1298 g (1 liter) of the clean white base paint of Example 1.

From Table 5 it can be seen that the fluorescent pigment provides a coloured coating composition in a high part of the range defined by Equation 4 (Region A).

Preparation of Alternative Coloured Coating Compositions

Examples 27 and 28

The coloured coating composition of Example 27 is prepared by adding 0.0364 g of coloured organic pigment in the form of CT Pigment Blue 15.3 Phthalocyanine (CAS 147-14-8) to 1414 g (1 liter) of the white base paint of Example 17. It can be seen from Table 5 that the coloured coating composition does not fall within the range of Equation 4 (Region A).

The coloured coating composition of Example 28 is prepared by adding 84.8 g of photoluminescent compound in the form of optical brightener Ciba® Uvitex® NFW (ex. Ciba Speciality Chemicals PLC, Charter Way, Macclesfield, Cheshire SK10 2NX) to the coloured coating composition of Example 27.

From Tables 1 and 5 it can be seen that the addition of the optical brightener gives a coloured coating composition that falls within the range of Equation 4 (Region A) despite the fact that a dirty white base paint is used, by virtue of the increased chroma and LRV.

Preparation of an Alternative Coloured Coating Composition

Example 29

The coloured coating composition of Example 29 is identical to the coloured coating composition of Example 27 except that the organic blue pigment is added to the white base paint of Example 1, i.e. the clean base paint, as opposed to the dirty white base paint of Example 17.

From Table 5 it can be seen the coloured coating composition falls within the range of Equation 4 (Region A).

Preparation of an Alternative Coloured Coating Composition

Example 30

The coloured coating composition of Example 30 is prepared by adding 26.0 g of optical brightener in the form of Ciba® Uvitex® NFW (ex. Ciba Speciality Chemicals PLC, Charter Way, Macclesfield, Cheshire SK10 2NX) to the coloured coating composition of Example 29.

From Table 5 it can be seen the coloured coating composition falls in a high part of the range of Equation 4 (Region A).

Preparation of Alternative Coloured Coating Compositions

Examples 31 to 44

Examples 31 to 44 are examples of alternative coloured coating compositions having a different hue and chroma which use coloured pigments in the form of inorganic pigments, in addition to organic pigments in the case of Examples 32, 36, 39, 40, 41, 42, 43, and carbon black pigment in the case of Example 44. Examples 31, 33, 34, 35, 37, 38 use inorganic pigments only. Each of the inorganic pigments are added to 1298 g of the white base paint of Example 1. The type and quantity of coloured pigment, together with the chroma, hue, minimum LRV required, and measured LRV for the coloured coating composition are given in Tables 1 and 5 in the same way as Examples 2 to 30.

Example 31 and Examples 33 to 35 contain two inorganic coloured pigments, i.e. more than the maximum of one inorganic coloured pigment required for the m and K values relating to colour region A, and therefore the values of m and K from Table 4 are inputted into Equation 4 to determine the minimum LRV required to be in the range defined by Equation 4 (Region B). It can be seen from Table 5 that the coloured coating composition of Example 31 falls within the range of Equation 4 (Region B).

Example 32 contains one inorganic coloured pigment, and one organic coloured pigment, the pigments are not of similar hue, and therefore the m and K values from Table 4 are inputted into Equation 4 determine the minimum LRV required to be in the range defined by Equation 4 (Region B). It can be seen from Table 5 that the coloured coating composition of Example 32 falls within the range of Equation 4 (Region B).

Example 36 contains a mixture of one inorganic coloured pigment, and one organic coloured pigment, however, from Table 9, it can be seen that the quantity of Pigment Red 112 is below that required to be significant, and therefore for the purposes of determining the relevant colour region, Example 36 contains only one inorganic pigment, and therefore the m and K values for colour region A apply. It can be seen from Table 5 that the coloured coating composition of Example 36 falls within the range of Equation 4 (Region A).

Example 37 contains two inorganic pigments, and therefore the m and K values for colour region B apply. It can be seen from Table 5 that the coloured coating composition of Example 37 falls within the range of Equation 4 (Region B).

Example 38 contains two inorganic pigments, however, from Table 9, it can be seen that the quantity of Pigment Red 101 is below that required to be significant, and therefore for the purposes of determining the relevant colour region, Example 38 contains only one inorganic pigment, and therefore the m and K values for colour region A apply. It can be seen from Table 5 that the coloured coating composition of Example 38 falls within the range of Equation 4 (Region A).

Examples 39, 40 and 41 contain a mixture of one inorganic coloured pigment, and one organic coloured pigment, however the two yellow pigments are considered to be of a similar hue, this being designated by (h) in Table 5, and therefore the m and K values for colour region A apply. It can be seen from Table 5 that the coloured coating composition of Example 39, 40 and 41 fall within the range of Equation 4 (Region A).

Examples 42 and 43 contain a mixture of two organic coloured pigments, and one inorganic coloured pigment.

In the case of Example 42, the quantities of Pigment Yellow 42 and Pigment Violet 23 are below that required to be significant, and therefore for the purposes of determining the relevant colour region, Example 42 contains only one organic pigment, and therefore the m and K values for colour region A apply. It can be seen from Table 5 that the coloured coating composition of Example 42 falls within the range of Equation 4 (Region A).

In the case of Example 43, the quantity of Pigment Blue 15.3 is below that required to be significant, and therefore for the purposes of determining the relevant colour region, Example 43 contains one organic pigment and one inorganic pigment, these pigments not being of similar hue. Therefore the m and K values for colour region B apply. It can be seen from Table 5 that the coloured coating composition of Example 43 falls within the range of Equation 4 (Region B).

Example 44 contains only black pigment in a quantity greater than 0.015 wt % but less than 0.022% of the total dry weight of the coloured coating composition. Therefore, the m and K values for colour region B apply. It can be seen from Table 5 that the coloured coating composition of Example 44 falls within the range of Equation 4 (Region B).

Preparation of an Alternative White Base Paint

Example 45

An alternative white base paint comprises the components and quantities as defined in Table 8 below.

TABLE 8

| Component | Sub-Component No. | Sub-Component Name | Sub-component Chemical Name | % by weight | LRV |
|---|---|---|---|---|---|
| Liquid carrier | 1 | Tap Water | Water | 15.0 | |
| | 2 | Humectant | Glycol ether | 2.40 | |
| | 3 | Dispersant | Aqueous solution of ammonium salt of an acrylic polymer. | 1.00 | |
| | 4 | Anti-foaming additive | Mineral oil blend (non-silicone). | 0.3 | |

TABLE 8-continued

| Component | Sub-Component No. | Sub-Component Name | Sub-component Chemical Name | % by weight | LRV |
|---|---|---|---|---|---|
| | 5 | Non-ionic surfactant | Aqueous solution of ethoxylated fatty alcohols. | 0.2 | |
| | 6 | Coalescing solvent | High boiling ester alcohols. | 1.25 | |
| | 7 | Biocide | Aqueous solution of isothiazolines and halogenated alkanol derivatives. | 0.18 | |
| | 8 | Thickeners | Hydrophobically-modified Ethylene Oxide Urethane (HEUR) and hydrophobically-modified polyacetal-polyether (HMPAPE) rheology modifiers. | 2.50 | |
| Extender | 9 | Extender | Coatings grade calcium magnesium carbonate. | 6.0 | 92.9 |
| Pigment | 10 | Pigment A | Coatings grade titanium dioxide (rutile). | 18.0 | 98.1 |
| | 11 | Pigment B | Opacifying Styrene-acrylic co-polymer latex (30% wt. solids) | 6.20 | |
| Film Forming Polymer | 12 | Binder | Acrylic copolymer latex (53% wt. solids), film-forming at ambient temperature. | 47.0 | |

The alternative white base paint of Example 45 is prepared as follows:

Firstly, a high-speed disperser is charged with 4 parts of the tap water. The stirrer of the disperser is set at a low speed, and sub-components 7, 3, 0.2 parts of 4 and 5 are added, followed by sub-components 9 to 11. The stirrer speed is then increased to a higher speed, and the mixture is dispersed for 10 minutes. Sub-components 6, 2, and 8 are added, and the mixture is dispersed for 20 minutes. 3 parts of sub-component 1 is then added. This preparation is referred to as the mill base.

Sub-components 11 and 12 are then added to a separate mixing vessel, and the stirrer is started. Sub-component 11, 6.04 parts of sub-component 1, the mill base, the remaining 0.1 parts of sub-component 4, and the remaining 1.93 parts of water is then added sequentially and the contents are stirred for 10 minutes.

The white base paint of Example 45 is prepared such that it has a LRV which is above 93, with the extender and pigment A and B selected accordingly. Equation 1 gives the light reflectance value ($Y_{model}$) of the white base paint of Example 45 as 96.7. The measured LRV of the white base paint is 96.1. Thus the white base paint of Example 45 is a clean base.

Preparation of an Alternative Coloured Coating Composition

Example 46

The coloured coating composition of Example 46 is prepared by adding 0.00503 g of CI Pigment Black 7 Carbon Black, 0.134 g of CI Pigment Yellow 42, and 0.000348 g CI Pigment Red 255 DPP, all in the form of stable dispersions (colorants), to 1243 g (1 liter) of the white base paint of Example 45 The coloured pigments are provided in a stable dispersion (colorant) that is readily miscible with the white base paint of Example 45.

Example 46 contains black pigment in a quantity less than 0.015 wt % of the total dry weight of the coloured coating composition. The quantity of Pigment Red 255 is not significant, and therefore the mixture contains one inorganic pigment, and the m and K values for colour region A apply. It can be seen from Table 5 that the coloured coating composition of Example 46 falls within the range of Equation 4 (Region A).

It can be seen from Table 5 that the coloured coating composition falls within the range of Equation 4 (Region A).

Preparation of an Alternative Coloured Coating Composition

Example 47

The coloured coating composition of Example 47 is prepared by adding 0.130 g of CI Pigment Black 7 Carbon Black to 1298 g (1 liter) of the white base paint of Example 45 The coloured pigment is provided in a stable dispersion (colorant) that is readily miscible with the white base paint of Example 1.

Example 47 contains only black pigment in a quantity greater than 0.022 wt % of the total dry weight of the coloured coating composition. Therefore, the m and K values for colour region B apply. It can be seen from Table 5 that the coloured coating composition of Example 47 does not fall within the range of Equation 4 (Region B).

It is to be understood that whilst the limit of black pigment relate to the use of carbon black, the limits will vary according to the type of black pigment. For example, a black pigment not as strong as carbon black can be added in greater quantity.

The criteria for determining the increased amount of black pigment permitted for alternative black pigments is the same as that used above in relation to determining whether or not a coloured pigment is present in significant quantities, i.e. alternative black pigments can be used up to a level that give a similar colour difference in the coating composition.

For convenience, the LRV and chroma values for all of the coloured coating compositions examples for both colour regions A and B are shown in FIGS. 1 and 2. The LRV and chroma values for each coating composition have been scaled as shown in the axis labels, using the m and K values corresponding to the hue of each coating composition, as determined from Tables 3 and 4. The scaling divides the LRV and Chroma values by the intercepts, on each axis, of the straight line defining the minimum LRV of the coating composition at each hue. This allows all the data to be plotted on a 2-D graph.

Thus it can be seen that the present invention relates to creating coloured coating compositions lying in either colour region A or B, by either selection of the number and type of coloured pigments and the formulation of the white base paint to achieve a minimum LRV of 93, or by using photoluminescent compounds independent of the LRV of the white base paint.

The invention claimed is:

1. A colored coating composition comprising a white base paint having a minimum light reflectance value of 93, and at least one colored pigment in a form that is mixed with the white base paint, the white base paint comprising a film-forming polymer, a liquid carrier, one or more opacifying white pigments and one or more extenders, the colored coating composition having a light reflectance value Y less than 110, and greater than that defined by the equation:

$$Y = mC + K,$$

where $25 > C > 1.0$, C being the chroma of the colored coating composition, m and K being empirical coefficients selected according to the type and number of the type of the at least one colored pigment, and dependent on the hue angle of the coating composition, wherein m and K determine a minimum colored coating composition light reflectance value relating to a color region A between this minimum and 110, m and K being defined according to the following table:

| Hue angle ° | m_A | k_A |
|---|---|---|
| 0 | −1.364 | 91.713 |
| 10 | −1.356 | 91.952 |
| 20 | −1.443 | 91.757 |
| 30 | −1.387 | 92.262 |
| 40 | −1.305 | 92.703 |
| 50 | −1.209 | 93.071 |
| 60 | −1.113 | 93.440 |
| 70 | −1.017 | 93.808 |
| 80 | −0.822 | 94.732 |
| 90 | −0.485 | 93.225 |
| 100 | −0.330 | 92.357 |
| 110 | −0.525 | 92.872 |
| 120 | −0.719 | 93.386 |
| 130 | −0.919 | 93.803 |
| 140 | −0.945 | 93.661 |
| 150 | −0.970 | 93.520 |
| 160 | −0.996 | 93.378 |
| 170 | −1.034 | 93.238 |
| 180 | −1.127 | 93.104 |
| 190 | −1.220 | 92.971 |
| 200 | −1.312 | 93.086 |
| 210 | −1.513 | 92.208 |
| 220 | −1.745 | 91.330 |
| 230 | −1.980 | 90.509 |
| 240 | −1.949 | 90.197 |
| 250 | −1.919 | 89.886 |
| 260 | −1.888 | 89.575 |
| 270 | −1.858 | 89.263 |
| 280 | −1.827 | 88.952 |
| 290 | −1.797 | 88.641 |
| 300 | −1.799 | 88.878 |
| 310 | −1.840 | 89.482 |
| 320 | −1.808 | 89.998 |
| 330 | −1.450 | 91.389 |
| 340 | −1.360 | 91.340 |
| 350 | −1.362 | 91.526 |
| 360 | −1.364 | 91.713 | or, m and K determine a minimum colored coating composition light reflectance value relating to a color region B between this minimum and 110, m and K being defined according to the following table:

| Hue angle ° | m_B | K_B |
|---|---|---|
| 0 | −1.650 | 90.213 |
| 10 | −1.643 | 90.452 |
| 20 | −1.587 | 90.957 |
| 30 | −1.581 | 87.462 |
| 40 | −1.433 | 91.903 |
| 50 | −1.337 | 92.271 |
| 60 | −1.267 | 89.640 |
| 70 | −1.145 | 93.008 |
| 80 | −0.911 | 93.432 |
| 90 | −0.553 | 92.425 |
| 100 | −0.355 | 91.557 |
| 110 | −0.558 | 88.072 |
| 120 | −0.743 | 92.586 |
| 130 | −1.006 | 93.003 |
| 140 | −1.032 | 92.861 |
| 150 | −1.057 | 92.720 |
| 160 | −1.083 | 92.578 |
| 170 | −1.131 | 92.438 |
| 180 | −1.224 | 92.304 |
| 190 | −1.317 | 92.171 |
| 200 | −1.410 | 92.286 |
| 210 | −1.643 | 91.408 |
| 220 | −1.874 | 90.530 |
| 230 | −2.169 | 89.709 |
| 240 | −2.138 | 89.397 |
| 250 | −2.145 | 86.086 |
| 260 | −2.077 | 88.775 |
| 270 | −2.047 | 88.463 |
| 280 | −2.016 | 88.152 |
| 290 | −1.985 | 87.841 |
| 300 | −1.968 | 88.078 |
| 310 | −2.009 | 88.682 |
| 320 | −1.986 | 89.198 |
| 330 | −1.806 | 89.889 |
| 340 | −1.646 | 89.840 |
| 350 | −1.648 | 90.026 |
| 360 | −1.650 | 90.213 | wherein for color region A the at least one colored pigment is:
  a maximum of two organic colored pigments in significant quantities, and there is a maximum of 0.015 wt % of carbon black pigment relative to the total dry weight of the colored coating composition, or
  a maximum of one inorganic pigment in a significant quantity, and there is a maximum of 0.015 wt % of carbon black pigment relative to the total dry weight of the colored coating composition, or one organic pigment, and one inorganic pigment, the organic pigment capable of producing a colored coating composition having a first hue, and the inorganic pigment capable of producing a colored coating composition having a second hue, the first and second hues being separated by a maximum angle of 20 degrees, and there is a maximum of 0.015 wt % of carbon black pigment relative to the total dry weight of the colored coating composition, wherein for color region B, the at least one colored pigment is:

three or more organic colored pigments in significant quantities, and there is a maximum of 0.022 wt % of carbon black pigment relative to the total dry weight of the colored coating composition, or two or more inorganic colored pigments in significant quantities, and there is a maximum of 0.022 wt % of carbon black pigment relative to the total dry weight of the colored coating composition, or one organic pigment, and one inorganic pigment, the organic pigment capable of producing a colored coating composition having a first hue, and the inorganic pigment capable of producing a colored coating composition having a second hue, the first and second hues being separated by more than 20 degrees, and there is a maximum of 0.022 wt % of carbon black pigment relative to the total dry weight of the colored coating composition.

2. The colored coating composition according to claim 1 wherein the white base paint has a minimum light reflectance value ($Y_{model}$) of 93 defined by the selection of the one or more opacifying white pigments and one or more extenders according to the equation:

$$Y_{model} = A + \frac{w \cdot \langle Y \rangle_{ext} + F \cdot (1-w) \cdot \langle Y \rangle_{pig}}{w + (1-w) \cdot F}$$

where w is the weight fraction of the extender compared to the total weight of the one or more opacifying white pigments and one or more extenders, A and F are empirical coefficients with values of 0.785 and −0.0969 respectively, $\langle Y_{ext} \rangle$ is the opacifying white pigments weight-averaged light reflectance value of the one or more extenders and $\langle Y_{pig} \rangle$ is the weight-averaged light reflectance value of the one or more opacifying white pigments, the weight averaged light reflectance values being defined by the equations:

$$\langle Y_{ext} \rangle = \frac{\sum_i w_i \cdot Y_{ext}}{\sum_i w_i}, \text{ and } \langle Y_{pig} \rangle = \frac{\sum_i w_i \cdot Y_{pig}}{\sum_i w_i}.$$

3. The colored coating composition according to claim 1 wherein at least one of the colored pigments is a fluorescent pigment capable of emitting light in a particular part of the visible spectrum such that it increases the chroma of the colored coating composition.

4. The colored coating composition according to claim 1, the colored coating composition having a particular hue, the colored coating composition further including a photoluminescent compound capable of emitting light in a particular part of the visible spectrum such that it increases the chroma of the colored coating composition.

5. The colored coating composition according to claim 4, wherein the photoluminescent compound is one or more of an optical brightener, a fluorescent pigment or a phosphorescent pigment.

6. The colored coating composition according to claim 5 wherein the optical brightener or the fluorescent pigment is dispersed in the white base paint of the colored coating composition.

7. The colored coating composition according to claim 1 wherein the colored coating composition is an architectural emulsion coating composition suitable for application to walls and/or ceilings.

* * * * *